May 10, 1955

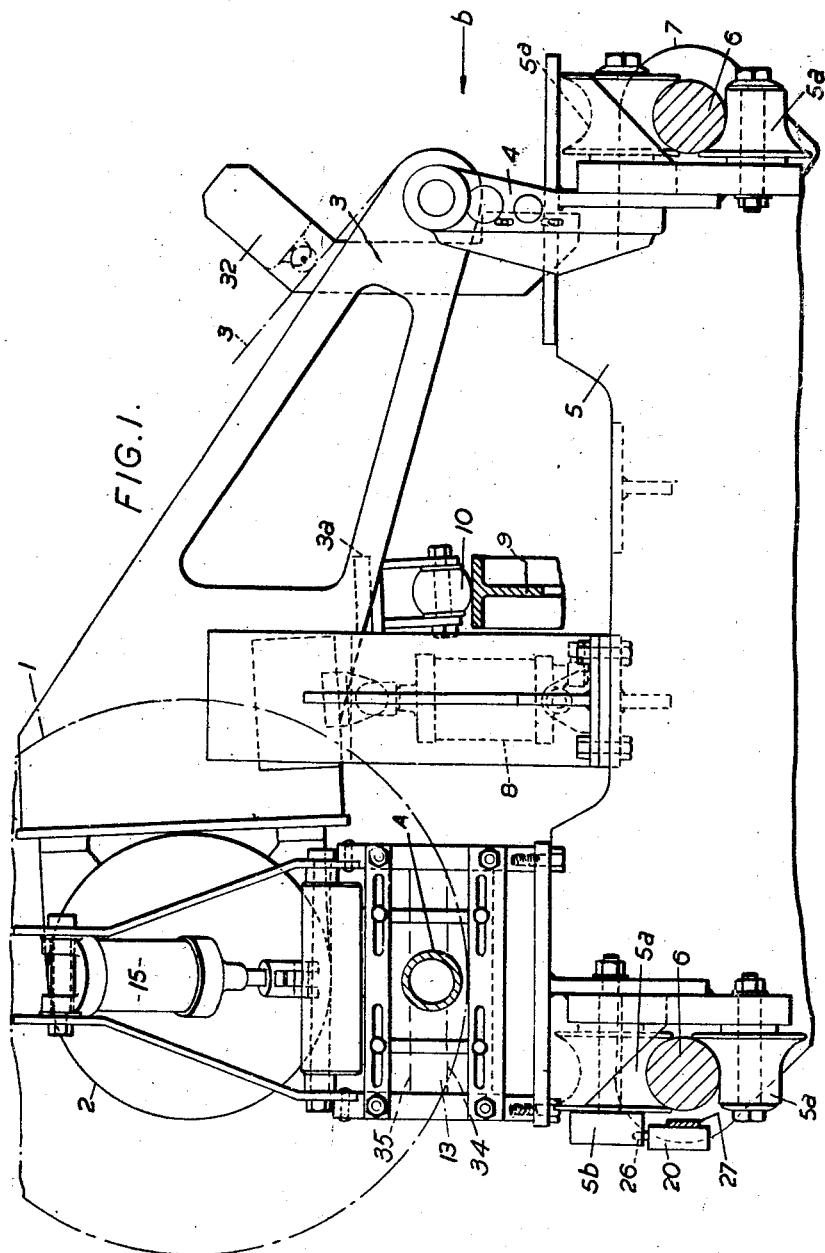

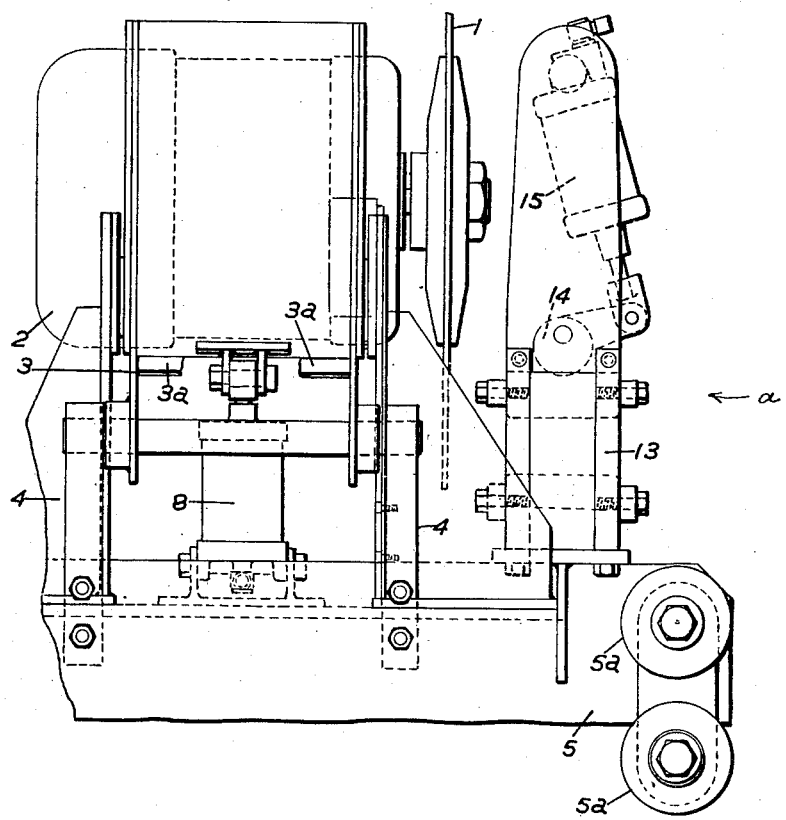

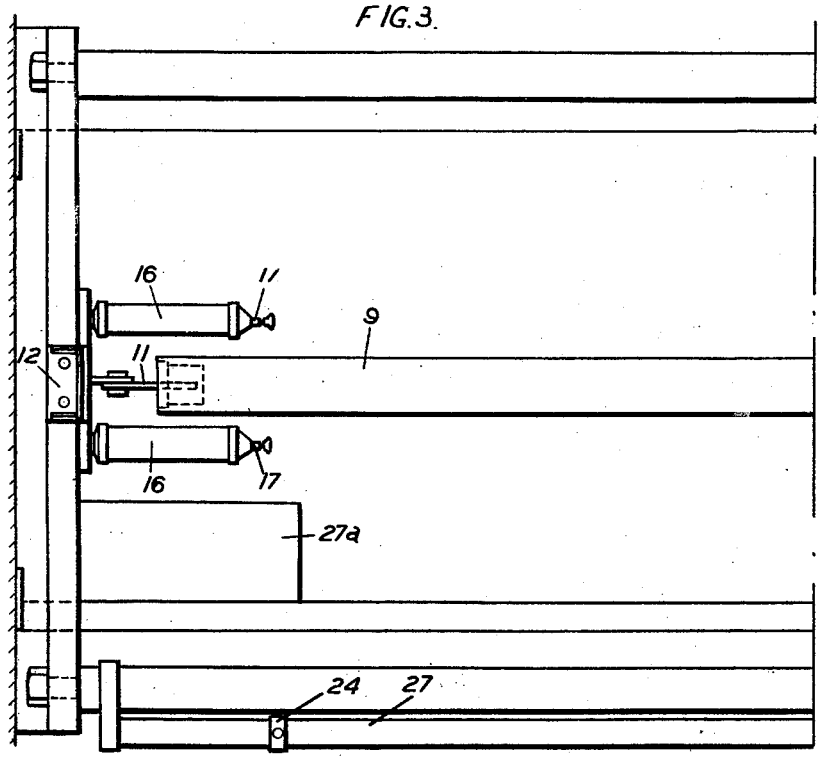
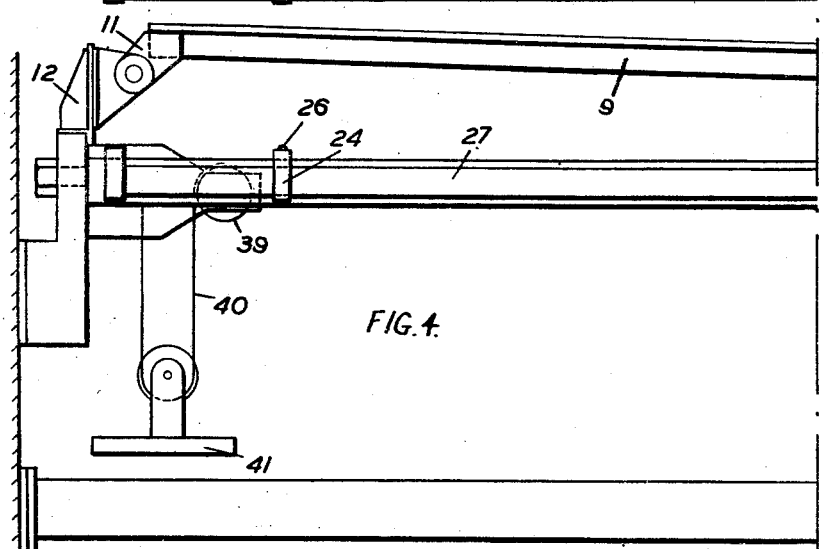

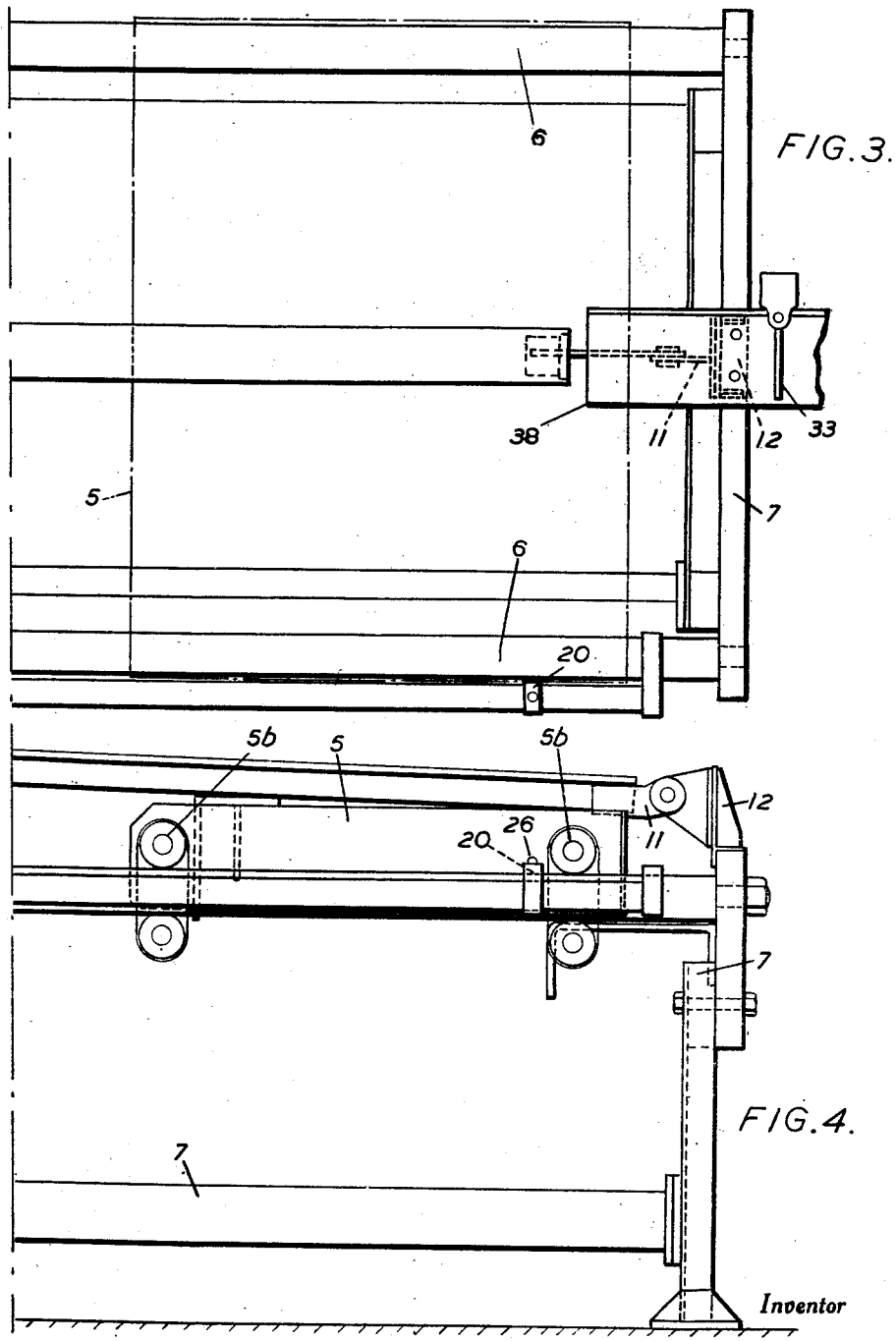

J. L. HENDERSON 2,707,816

MEANS FOR SAWING OFF LENGTHS OF TUBING
OR OTHER LENGTHS OF MATERIAL

Filed June 5, 1951

J.L.Henderson
Inventor

By
*Attorneys.*

United States Patent Office 2,707,816
Patented May 10, 1955

2,707,816

MEANS FOR SAWING OFF LENGTHS OF TUBING OR OTHER LENGTHS OF MATERIAL

John Leonard Henderson, Blaenrhondda, South Wales

Application June 5, 1951, Serial No. 229,915

2 Claims. (Cl. 29—69)

This invention relates to means for sawing off lengths of tubing, or lengths of other material, continuously fed to a sawing machine, of the type comprising a base frame, a carriage mounted to travel on the base frame, a clamp for fixing the carriage to the work-piece so that it travels therewith during the sawing off process, means for returning the carriage for the next sawing off process, a member carrying a circular saw and a motor driving the saw, a cam bar for effecting the cutting feed of the saw whilst the carriage is travelling during the sawing process, and means for retracting and applying the saw to the work-piece, and this invention has for its object means whereby the machine is readily adapted for dealing with articles of different size in cross-section, and to provide for any different lengths of travel of the saw during the cut to thereby obviate any unnecessary length of travel. A further object of the invention is to provide an improved cam bar for controlling the cutting feed of the saw, whereby the saw is advanced by gravity during the saw cut and whereby the saw blade is free to lift against the gravity feed during the cutting action. A still further object is to provide means for lifting the saw away from the tube or the like after the saw cut and for lowering the saw into position for commencing the next saw cut. Another object is to ensure that the saw is withdrawn before the means for releasing the pipe clamp is operated.

Referring to the drawings:

Figure 1 is a front elevation of the saw carriage looking in the direction of arrow a, Figure 2.

Figure 2 is an end view of the carriage shown by Figure 1, looking in the direction of arrow b, the cam roller being removed for convenience of illustration.

Figure 3 is a plan view of the frame on which the saw carriage is mounted.

Figure 4 is a side elevation of the frame shown by Figure 3, and

Figure 5 is a diagrammatic view of the automatic controls for the machine.

According to a convenient embodiment of this invention, a circular saw blade 1 and an electric motor 2 driving the same are mounted on an arm 3 which is pivotally mounted on brackets 4 on a carriage 5 having rollers 5a which run on guide rails 6, conveniently in the form of tubes, mounted on a frame 7. The pivoted arm 3 is adapted to be lifted by means of a piston in a compressed air cylinder 8 into an inoperative position, which, when the air is released from the cylinder, allows the arm to drop by gravity for feeding the saw on to the tube or the like to have a length parted therefrom. When the arm is allowed to fall it is supported by a cam bar 9, so that as the carriage moves the saw is controlled in its cutting feed by the inclination of the cam bar. The air is released from the air cylinder 8 at a controlled rate to control the fall of the arm 3 on to the cam bar. The arm 3 carries a roller 10 for bearing on the cam bar, the roller being mounted on a transverse member 3a of the arm 3. Each end of the cam bar 9 is adjustably mounted on the machine frame 7 by pivotally mounting bracket 11, on the ends of the cam bar, on adjustable slides 12 which thus enables the cam bar to be moved towards or from the work-piece, or to adjust the inclination of the cam bar to control the rate of feed of the saw and thus allow the work-piece to be sawn through during a variable and predetermined length of travel of the carriage 5 carrying the saw. This latter carriage 5 also carries a clamp 13 which is operated to clamp the carriage to the tube A or the like to be sawn and which, for instance, is passing from a rolling mill, whereby the carriage is moved with the tube and the tube supported for the sawing operation. The clamp comprises a fixed jaw 34 and a movable jaw 35, and the movable jaw is moved into the clamping position by means of an eccentric 14 having an arm thereon which is coupled to the piston rod of a compressed air cylinder 15.

Air is admitted to the cylinder 8 by way of a pipe line 18 through a control valve 19. When the carriage 5 is at the commencement of its forward movement for the sawing operation, the valve 19 is in position shutting off the supply of air to the cylinder 8 and it also opens such cylinder 8 to exhaust, thus allowing the saw arm 3 to rest on the cam bar 9. When the carriage 5 has moved to the end of its cutting stroke, the valve 19 is opened to admit air to the cylinder 8 and raise the saw arm 3. This is effected by means of a tappet valve member 20 which is normally closed to close communication between the pipe lines 21 and 22. The air pressure line 21 is in communication with the air feed line 18, whilst the exhaust pipe line 22 is in communication with the piston chamber 23 having a piston therein which is moved to open or close the valve 19. When therefore the tappet valve 20 is opened by a projection 5b on the forward upper roller 5a of the carriage 5, air pressure is fed into one side of the piston in the chamber 23 to open the valve 19 to admit air into the cylinder 8 and thus raise the saw arm 3. The piston in the piston cylinder 23 remains in the position to which it has been moved and thus retains the valve 19 in the open position after the tappet valve 20 has been closed. A second tappet valve 24 is depressed by a projection 5b on the rear upper roller 5a of the carriage 5 when it reaches the end of its return travel and supplies air under pressure to return the piston in the cylinder 23 and thus close the valve 19 and open the cylinder 8 to exhaust so that the arm again drops onto the cam bar 9, the rate of drop being controlled by the rate of exhaust of the air. The tappet valve 24 is in communication with the compressed air feed pipe 21, and the exhaust pipe 25 from such valve communicates with the cylinder 23 on the reverse side to that in communication with the pipe 21. Thus when the tappet valve 24 is opened, compressed air is supplied by the pipe 25. The tappet valves 20 and 24 are mounted on a bar 37 on the machine frame and the projections 5b on the carriage 5 operate the tappet valves by depressing the tappets 26.

The compressed air to the clamping cylinder 15 is controlled by a solenoid operated valve 27a which, in the normal position with the energising circuit open, places the compressed air feed line 28 in communication with the air line 29 feeding air into the lower end of the cylinder 15 to raise the piston therein and release the clamp clamping the tube A, and at the same time the pipe line 30 passing from the other end of the cylinder is in communication with the exhaust passage 31 of the valve 27a. When the solenoid is energised, the inlet pipe 28 is placed in communication with the pipe line 30 and the pipe line 29 is placed in communication with the exhaust 31. After the length of tube has been severed, the saw carrying arm 3 is raised as aforedescribed and the saw arm moves against a limit electric switch 32 mounted on the carriage 5 which breaks the solenoid electric circuit, thus releasing the clamp on the tube and allowing the carriage 5 to be free to move on its return stroke with the saw arm raised clear of the cam bar. As the carriage is returning, the tube is travelling from the tube rolling mill and after the carriage has returned to its initial position the end of the moving tube A is timed to move against the pivoted arm 33 of a switch adjustably mounted on a pipe support 38 on the machine frame 7, which energises the solenoid of the valve 27a and thus closes the jaws 34 and 35 of the clamp so that the carriage again moves forward to sever another length of tube, the saw arm 3 as aforedescribed being lowered onto the cam bar for the sawing operation. In order to overcome the inertia of the stationary carriage, air pressure plungers 17 in the air cylinders 16 are forced outwardly against the carriage 5 by feeding air to the cylinders simultaneously with the closing of the clamp, to thus avoid slip as the clamp is being closed on the tube moving from the rolling or tube making mill. The cylinders 16 mounted on the frame of the machine are placed in communication, by the pipe line 36, with the pipe line 30 feeding air to the cylinder 15 to close the clamp, so that, as the clamp is closed, the plungers 17 are forced outwardly, and when the clamp is released, air pressure is shut off from the cylinders 16. After air pressure is shut off, the cylinders remain filled with air so that on the return stroke the air forms a cushion and by a suitable valve arrangement the air can pass through an adjustable restricted passage to adjust the cushioning action. The carriage is moved in the return direction by means of the weight 41 which is mounted on the cable 40 which passes over the pulley 39 to the anchorage on the carriage, the other end of the cable being anchored to the frame. By adjusting the position of the tappet valve 20, the length of travel of the carriage 5 is adjusted.

Having thus described the invention, what is claimed as new and desired to be secured by Letters Patent, is:

1. A sawing machine for sawing off lengths from a tube or a work-piece which is being continuously fed to the sawing machine comprising a base frame, a carriage mounted to travel on the base frame, a clamp for fixing the carriage to the work-piece so that it travels therewith during the sawing-off process, means for returning the carriage for the next sawing-off process, an arm carrying a circular saw and a motor driving the saw and pivotally mounted on the carriage to be lowered to bring the saw into contact with the tube to be sawn or raised with the saw clear of the tube, a cam bar mounted longitudinally on the machine and forming a runner and a support for the weight of the saw carrying arm in the sawing position and controlling the rate of cutting feed of the saw whilst the carriage is travelling during the sawing process, means mounted on said carriage for raising the saw carrying arm at the end of the sawing operation and for lowering the said arm for the commencement of the sawing operation comprising a piston in a pneumatic cylinder mounted on said carriage for raising the saw carrying arm, an adjustably positioned trip valve for opening the said cylinder to a compressed air supply to lift the saw carrying arm at the end of the saw cut, means on the said carriage for operating the trip valve, a second adjustably positioned trip valve operated by the carriage for shutting off the compressed air to said cylinder and opening the cylinder to exhaust to allow the saw carrying arm to drop into sawing position for commencing the next saw cut.

2. A sawing machine for sawing off lengths from a tube or a work-piece which is being continuously fed to the sawing machine comprising a base frame, a carriage mounted to travel on the base frame, a clamp for fixing the carriage to the work-piece so that it travels therewith during the sawing-off process, means for returning the carriage for the next sawing off process, an arm carrying a circular saw and a motor driving the saw and pivotally mounted on the carriage to be lowered to bring the saw into contact with the tube to be sawn or raised with the saw clear of the tube, a cam bar mounted longitudinally on the machine and forming a runner and a support for the weight of the saw carrying arm in the sawing position and controlling the rate of cutting feed of the saw whilst the carriage is travelling during the sawing process, means mounted on said carriage for raising the saw carrying arm at the end of the sawing operation and for lowering the said arm for the commencement of the sawing operation comprising a piston in a pneumatic cylinder mounted on said carriage for raising the saw carrying arm, an adjustably positioned trip valve for opening the said cylinder to a compressed air supply to lift the saw carrying arm at the end of the saw cut, means on the said carriage for operating the trip valve, a second adjustably positioned trip valve operated by the carriage for shutting off the compressed air to said cylinder and opening the cylinder to exhaust to allow the saw carrying arm to drop into sawing position for commencing the next saw cut, and means operated when the saw carrying arm is moved into the raised position for opening said clamp for fixing the carriage to the work-piece.

References Cited in the file of this patent

UNITED STATES PATENTS

| | | |
|---|---|---|
| 1,439,963 | Kamper | Dec. 26, 1922 |
| 1,803,020 | Kalgren | Apr. 28, 1931 |
| 1,844,837 | Braun | Feb. 9, 1932 |
| 1,946,926 | Barton | Feb. 13, 1934 |
| 2,332,013 | Rudert et al. | Oct. 19, 1943 |
| 2,351,962 | Harrison | June 20, 1944 |
| 2,360,070 | Meyerbach | Oct. 10, 1944 |

FOREIGN PATENTS

| | | |
|---|---|---|
| 121,257 | Great Britain | Mar. 26, 1946 |